United States Patent [19]
Miller

[11] Patent Number: 5,303,125
[45] Date of Patent: Apr. 12, 1994

[54] FIBER OPTIC AIMABLE SPOTLIGHT LUMINAIRE

[76] Inventor: Jack V. Miller, 700 N. Auburn Ave., Sierra Madre, Calif. 91024

[21] Appl. No.: 49,833

[22] Filed: Apr. 19, 1993

[51] Int. Cl.⁵ .............................................. F21V 8/00
[52] U.S. Cl. ...................... 362/32; 362/141; 362/147; 362/277; 362/449; 385/901
[58] Field of Search ............... 385/33, 89, 901; 362/32, 147, 138, 139, 277, 278, 449, 140, 141

[56] References Cited

U.S. PATENT DOCUMENTS

| | | | |
|---|---|---|---|
| 2,195,526 | 4/1940 | Traver | 362/139 |
| 3,382,408 | 5/1968 | Atkins | 362/138 |
| 3,556,086 | 1/1971 | Gordon | 362/139 |
| 3,614,415 | 10/1971 | Edelman | 362/32 |
| 4,521,834 | 6/1985 | Orr | 362/139 |
| 4,529,264 | 7/1985 | Schmidt et al. | 362/32 |
| 4,850,669 | 7/1989 | Welker et al. | 362/32 |
| 5,000,535 | 3/1991 | Churchill | 362/32 |
| 5,099,399 | 3/1992 | Miller et al. | 362/32 |

*Primary Examiner*—Richard R. Cole
*Assistant Examiner*—Alan B. Cariaso

[57] ABSTRACT

A fiber optic aimable spotlight luminaire includes a generally cylindrical tubular housing having a proximal end, a distal end and an optical axis therethrough. A fiber optics light guide light has a first end receiving light from a remote source of illumination and a second, light-emitting end on the optical axis in the proximal end of the housing. An optical element on the optical axis of the housing has a focus generally at the second end of the fiber optics light guide, whereby light emitted by the light guide forms a generally collimated beam of light from the optical element. The position of the light guide within the housing is axially adjustable to de-collimate and zoom the beam. A rotatable and bendable bracket supports a mirror at the distal end of the housing with the mirror oriented at an angle whereby the collimated beam of light is reflected off aids as a transverse beam of light at an angle to the optical axis of the lens. In a preferred embodiment the housing is externally threaded and is retained in a planar panel by nuts engaging the threaded exterior of the housing and compressively engaging with the panel.

14 Claims, 2 Drawing Sheets

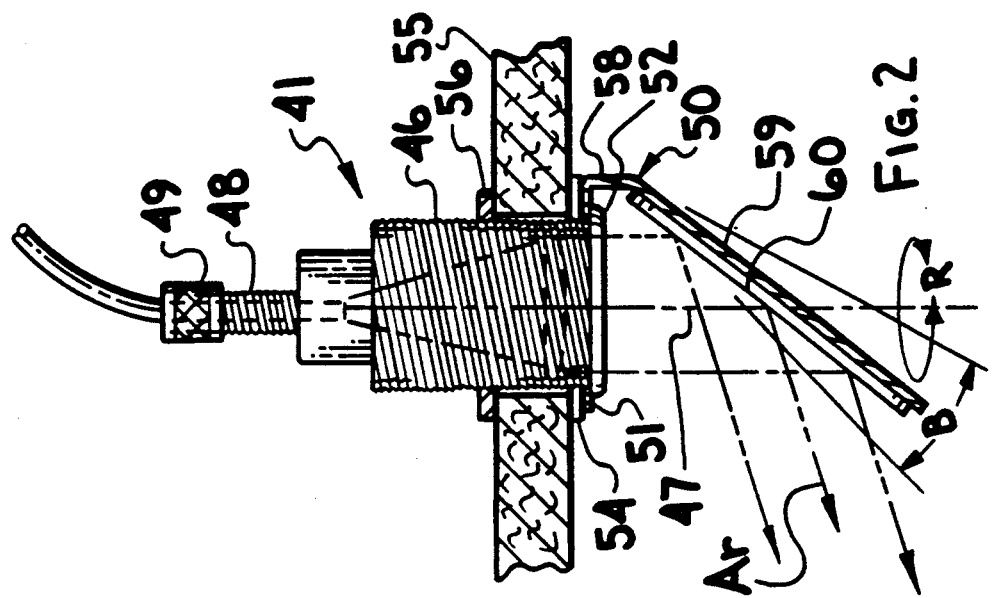
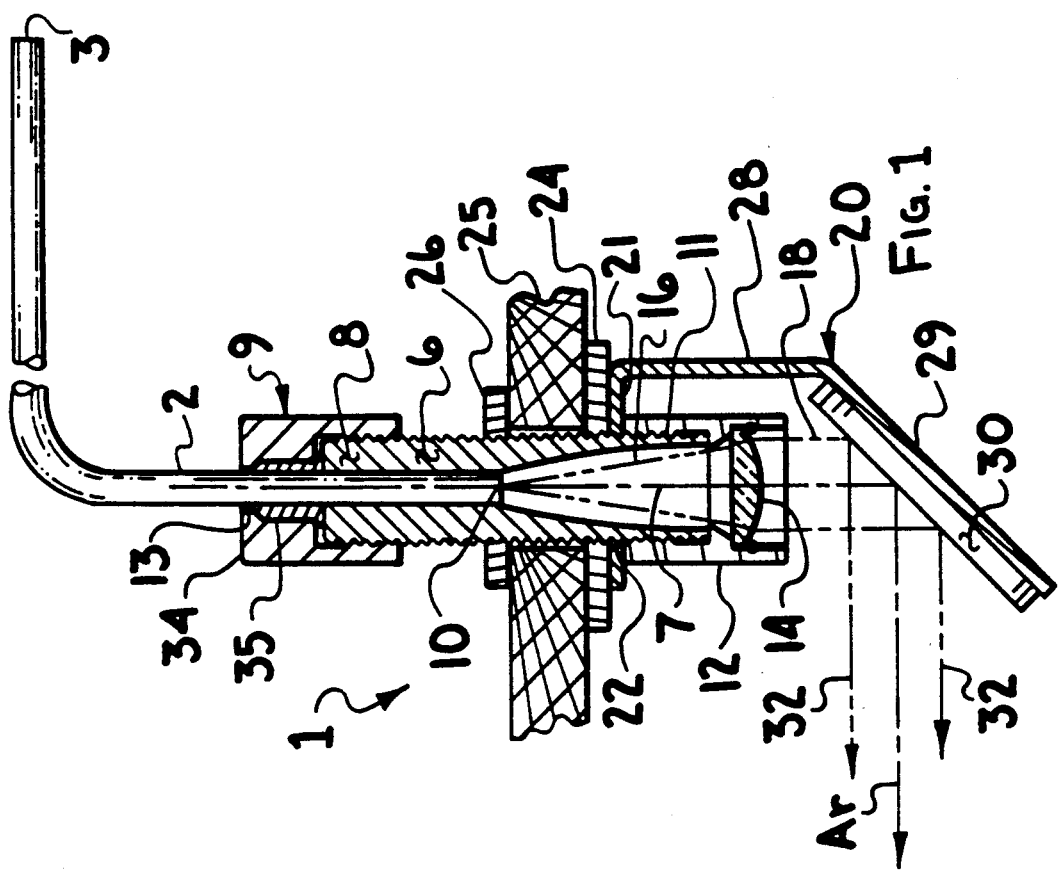

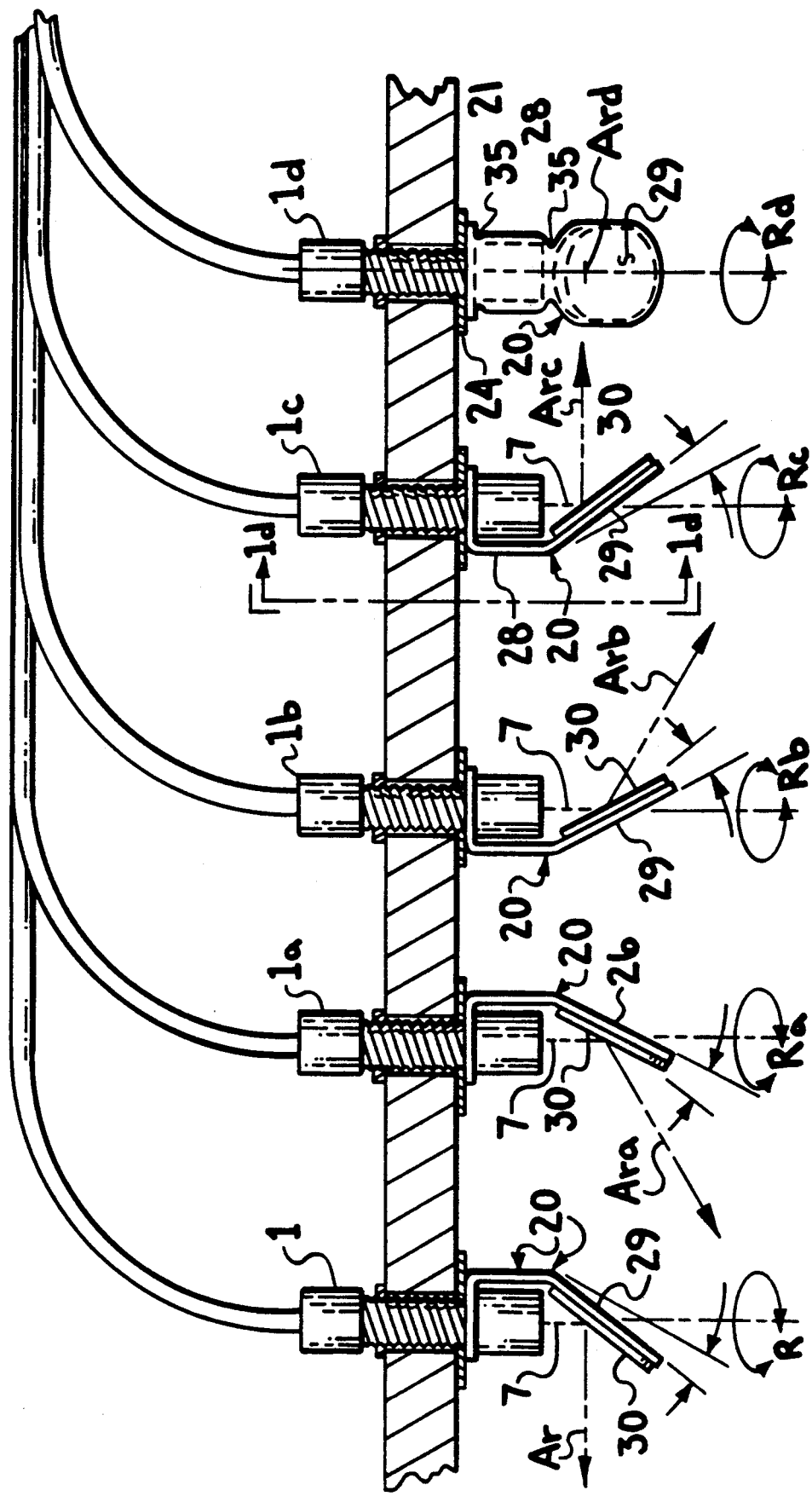

FIBER OPTIC AIMABLE SPOTLIGHT LUMINAIRE

BACKGROUND OF THE INVENTION

This invention applies to the field of fiber optics, and more particularly to spotlight luminaires for ceiling mounting with the capability of being aimed in any desired direction. This function has previously been performed by track light fixtures that are attached to a ceiling and are gimballed for aiming the light beam, such as is shown in the inventor's U.S. Pat. No. 4,906,743.

Prior art aimable fiber optic light spotlights are known, but are in the form known as "eyeball" fixtures that are mountable in a ceiling panel, but are limited to aiming at no more than a 30° angle from nadir. Other prior art fiber optic luminaires are aimable by bending a deformable sheath, such as is shown in the Churchill U.S. Pat. No. 5,000,535 for a fiber optic light bar.

The primary purpose of the present invention is to provide a fiber optic luminaire having a beam on an optical axis and mountable at any location on a planar panel, such as a ceiling, in which the light beam may be reflectively aimed off axis from nadir up to 90° in elevation; and the off-axis beam may be rotated about optical axis of the luminaire over 360° in azimuth.

SUMMARY OF THE INVENTION

The achievement of the foregoing purposes of the invention is accomplished by the present invention in which a fiber optic luminaire includes a fiber optics light guide light having a first end receiving light from a remote source of illumination and a second, light-emitting end in a generally cylindrical tubular housing having an optical axis therethrough, a proximal end having a light guide retainer for adjustably holding the second end of the light guide therein, and a distal end including an enlarged flange.

An optical element on the optical axis at the distal end of the housing is in focus at the second end of the light guide, whereby light emitted by the light guide is formed into a generally collimated beam of light on the optical axis by the optical element.

A mirror-mount bracket is rotatable about the optical axis, having a first portion disposed normal to the optical axis and having a hole therethrough encompassing the cylindrical tubular housing and rotatable about the housing. A bendable second portion of the bracket extends from the first portion tangent to the flange of the tubular housing and extends generally parallel to the optical axis in the distal direction. A third portion of the bracket extends distally from the second portion, oriented at an angle intercepting the optical axis and including a mirror reflecting the beam of light off the optical axis to form a transverse beam at an angle to the optical axis of the lens.

In a preferred embodiment the tubular housing is externally threaded, the flange means is a threaded lens bezel screwed onto the threads of the housing. The luminaire may be mounted into a planar panel by a pair of knurled nuts screwed onto the threads of the housing. Also in a preferred embodiment, the light guide retaining means is compression nut on the proximal end of the housing, which axially compresses a collet, reducing its diameter and circumferentially engaging the light guide.

BRIEF DESCRIPTION OF THE DRAWINGS

FIG. 1 is a side cross-sectional view of a fiber optic aimable spotlight luminaire of a first preferred embodiment of the present invention;

FIG. 2 is a side elevational view of a second embodiment of a fiber optic aimable spotlight luminaire according to the invention; and FIG. 3 is a side cross-sectional view of a ceiling panel including a plurality of optic aimable spotlight luminaires of FIG. 1.

DETAILED DESCRIPTION OF THE DRAWINGS

In FIG. 1 a fiber optic aimable spotlight luminaire 1 of a first preferred embodiment of the present invention is shown having a fiber optics light guide light 2 having a first end 3 receiving light from a remote source of illumination, which is not shown, but may be of the type disclosed in the applicant's U.S. Pat. No. 5,099,399, and a second, light-emitting end 10. A generally cylindrical tubular housing 6 has an optical axis 7 therethrough, a proximal end 8 having a light guide retaining means 9 for adjustably holding the second end 10 of the light guide 2 therein, and a distal end 11 including an enlarged Range means, shown as a lens-holding bezel 12.

An optical element 14 on optical axis 7 at the distal end 11 of the housing 6 has its focus at the second end 10 of light guide 2, whereby light 16 emitted by the light guide 2 forms a generally collimated beam of light 18 on optical axis 7.

A mirror-mount bracket 20 is formed as a generally rectangular metal strap rotatable about optical aids 7 has a first portion 21 disposed normal to optical axis 7 and has a hole 22 therethrough encompassing cylindrical tubular housing 6. First portion 21 is rotatable about housing 6 and has a washer 24, a ceiling panel 25 and an internally-threaded nut 26 engaged onto external threads 27 of housing 6 for holding first portion 21 in frictional contact with flange means 12 of housing 6. A bendable second portion 28 extends from first portion 21 alongside flange means 12 of housing 6, extending generally parallel to optical axis 7 in the distal direction. Bracket 20 also includes a third portion 29 extending from second portion 28, and oriented at an angle intercepting optical axis 7 and including a mirror 30 which reflects the beam of light 18 from the optical element 14, shown as a lens, off optical axis 7 to form a transverse beam of light 32 on a reflected aids Ar at an angle to optical axis 7.

Light guide retaining means 9, which adjustably holds second end 10 of the light guide 2 therein, is threadably engaged onto the threaded exterior of housing 6, having an aperture 13 slidable on the light guide 2, thereby forming a compression nut 34 axially compressing a resilient collet 35 to lock the position of light guide second end 10 in a selected axial location on optical axis 7. By moving second end 10 of light guide 2 away from the focus of light rays 16, beam 18, and thus reflected beam 32, may be decollimated and zoomed to a larger size beam.

In FIG. 2 a second embodiment of a fiber optic aimable spotlight luminaire 41 according to the invention is shown having generally cylindrical stepped-diameter tubular housing 46 having an optical axis 47 therethrough in a manner similar to that shown in FIG. 1. A proximal end 48 of housing 46 has a fiber retaining means 49, similar to that shown in FIG. 1 for holding and axially positioning light guide 42 therein and a distal end 51 including an enlarged and integral flange means 52, including a lens, but is similar to the arrangement shown in FIG. 1. Substantially collimated light is emitted on optical axis 47 to form a transverse beam of light on reflected axis Ar at an angle to optical axis 47. By bending a second portion 58 of mirror bracket 50 to any position within shown angle B, reflected axis Ar may be moved by the angular change of mirror 60 into a desired beam elevation angle. By rotating first portion 51 of bracket 50 about housing 46, mirror 60 is rotated a rotation angle R about optical axis 47 to rotate reflected aids Ar in azimuth. Flat washer 54 is shown compressionally engaged between first portion 51 of mirror bracket 50 to protect ceiling panel 55 from abrasion during rotation of bracket 50 for azimuth aiming.

In FIG. 3 a side cross-sectional view of a ceiling panel includes a plurality of optic aimable spotlight luminaires of FIG. 1, which shown the various aiming orientations of mirror 21.

Luminaire 1 is shown with third portion 29 of bracket 20 holding mirror 30 at a 45° angle, reflecting light at a 90° angle with respect to optical axis 7, and rotated to an azimuth angle Rd wherein the reflected axis Ar is to the left of the figure.

Luminaire 1a is shown with third portion 29 of bracket 20 holding mirror 30 at less than a 45° angle, reflecting light at an obtuse angle with respect to optical axis 7, and rotated to an azimuth angle Rda wherein the reflected axis Ara is to the left of the figure.

Luminaire 1b is shown with third portion 29 of bracket 20 holding mirror 30 at less than a 45° angle, reflecting light at an obtuse angle with respect to optical axis 7, and rotated to an azimuth angle Rb wherein the reflected axis Arb is to the right of the figure.

Luminaire 1c is shown with third portion 29 of bracket 20 holding mirror 30 at a 45° angle, reflecting light at a 90° angle with respect to optical axis 7, and rotated to an azimuth angle Rc wherein the reflected axis Arc is to the right of the figure.

Luminaire 1d is a view of luminaire of 1e, taken along section lines 1d—1d and showing shown with second portion 28 of bracket 20 narrower in width than the first portion 24 or the third portion 29, and wherein second portion 28 is also provided with additionally-narrowed areas 35 to facilitate local bending for both angular and transverse positioning of mirror 30.

The purposes of the invention are accomplished by the present invention which has been shown to provide practical and effective fiber optic aimable spotlight luminaires in actual commercial practice. The principles taught herein are applicable in other embodiments which will be obvious to others in the art, but which are considered within the scope of this disclosure.

I claim:

1. A fiber optic aimable spotlight luminaire including:
    a fiber optics light guide light having a first end receiving light from a remote source of illumiation and a second, light-emitting end;
    a generally cylindrical tubular housing having an optical axis therethrough, a proximal end having a light guide retaining means for adjustably holding the second end of the light guide therein, and a distal end including an enlarged flange means;
    an optical element on the optical axis at the distal end of the housing, said optical element having a focus at the second end of the light guide, whereby light emitted by the light guide is formed by the optical element into a generally collimated beam of light on the optical axis;
    a mirror-mount bracket rotatable about the optical axis, said bracket having a first portion disposed normal to the optical aids and having a hole therethrough encompassing the cylindrical tubular housing, said first portion rotatable about said housing and having a means for holding said first portion in frictional contact with the flange means of the housing, a bendable second portion of said bracket extending from the first portion tangent to the flange means of the housing and extending generally parallel to the optical axis in the distal direction, and a third portion of said bracket distal to the second portion, said third portion extending from the second portion, said third portion oriented at an angle intercepting the optical axis and including a mirror which reflects the beam of light from the optical element off the optical axis to form a transverse beam of light at an angle to the optical axis.

2. A fiber optic luminaire according to claim 1, further including a means for adjusting the axial position of the second end of the light guide with respect to the optical element, whereby the collimated beam of light from the lens may be de-collimated and zoomed to a larger size beam.

3. A fiber optic luminaire according to claim 1 in which the tubular housing is externally threaded and mountable in a planar panel held compressively against the flange means by a nut screwed onto the threads of the housing.

4. A fiber optic luminaire according to claim 1 in which the tubular housing is externally threaded, the flange means is an first nut screwed onto the threads of the housing, and said luminaire may be mounted into a planar panel which is held compressively against the first nut by a second nut screwed onto the threads of the housing.

5. A fiber optic luminaire according to claim 1 in which the nuts are externally knurled.

6. A fiber optic luminaire according to claim 1 in which the second portion of the mirror-mount bracket is a generally rectangular metal strap having a length from a first end of the first portion, a second portion connected to the first portion, said second portion of the strap including at least one narrowed area of reduced width more susceptible to bending than the remainder of the strap, and a third portion connected to the second portion, said third portion terminating in a second end of said strap.

7. A fiber optic luminaire according to claim 6 in which the second portion strap includes a first narrowed area of reduced width at a first end and a second narrowed area of reduced width at a second end, whereby the third portion of the mirror-mount bracket including the mirror is movable in angle and transverse position with respect to the optical axis by bending one or more of the narrowed areas of the second portion of the strap.

8. A fiber optic luminaire according to claim 2 in which the tubular housing is externally threaded and in which the means for holding the axial position of the second end of the light guide is a compression nut having a first portion internally threaded and in engagement with the externally threaded housing and a second portion having an aperture slidable on the light guide, wherein tightening said compression nut onto the threaded proximal end of the housing axially compresses a resilient collet which circumferentially engages the light guide.

9. A fiber optic aimable spotlight luminaire including:
   a fiber optics light guide light having a first end receiving light from a remote source of illumination and a second, light-emitting end;
   a generally cylindrical tubular housing having an optical axis therethrough, a proximal end having a fiber retaining means for holding and axially positioning the light guide therein and a distal end including an enlarged flange means including a lens, said lens having a focus approximately at the second end of the light guide, whereby light emitted by the light guide forms a generally collimated beam of light on the optical axis; and
   a mirror-mount bracket rotatable about the optical axis, said bracket having a first portion disposed normal to the optical axis and having a hole therethrough encompassing the cylindrical tubular housing, said first portion rotatable about said housing, a bendable second portion of said bracket extending from the first portion tangent to the flange means of the housing and extending generally parallel to the optical axis in the distal direction, and a third portion second portion of said bracket distal to the second portion, said third portion extending from the second portion, said third portion oriented at an angle intercepting the optical aids and including a mirror which reflects the beam of light from the lens off the optical axis to form a transverse beam of light at an angle to the optical axis of the lens.

10. A fiber optic luminaire according to claim 9 in which the housing is externally threaded and flange means is a lens bezel threadably engaged onto the tubular housing.

11. A fiber optic luminaire according to claim 10 in which a first nut is threadably engaged onto the proximal end housing in compressive contact with a first side of a generally planar panel and a second nut is threadably engaged onto the distal end housing and in compressive contact with the first portion of the mirror mounting bracket; whereby the first portion of the mirror mounting bracket is held in compressive contact with a second side of the generally planar panel.

12. A fiber optic luminaire according to claim 11 in which a washer is disposed between the first portion of the mirror mounting bracket and the generally planar panel.

13. A fiber optic luminaire according to claim 10 in which the means for adjustably holding the light guide is a compression nut having a first portion threadably engaged at the proximal end of the externally threaded housing and a second portion having an aperture slidable on the light guide, wherein tightening said compression nut onto the threaded proximal end of the housing axially compresses a resilient collet which circumferentially engages the light guide.

14. A fiber optic luminaire according to claim 1 or 9 in which the second portion of the mirror mounting bracket may be bent so as to cause the mirror to intercept and reflect a portion of the beam off the optical axis, with another portion of the beam remaining on the optical axis.

* * * * *